INVENTOR.
WILLIAM S. HOLMES
GEORGE E. RICHMOND
AGENT.

INVENTOR.
WILLIAM S. HOLMES
GEORGE E. RICHMOND
BY Allen J Jaffe
AGENT.

INVENTOR.
WILLIAM S. HOLMES
GEORGE E. RICHMOND
BY
AGENT.

United States Patent Office 3,497,704
Patented Feb. 24, 1970

3,497,704
AUTOMATIC PHOTO-CULTURE DETECTION SYSTEM FOR DETERMINING THE PRESENCE AND LOCATION OF LOW CURVATURE OBJECTS IN PHOTOGRAPHIC DATA
William S. Holmes, West Falls, and George E. Richmond, Snyder, N.Y., assignors to Cornell Aeronautical Laboratory, Inc., Buffalo, N.Y., a corporation of New York
Filed June 8, 1966, Ser. No. 556,025
Int. Cl. G01d 5/36; G01n 21/30; H01j 39/12
U.S. Cl. 250—233                                    6 Claims

ABSTRACT OF THE DISCLOSURE

A system for automatically distinguishing between man-made objects such as roads and tracks and natural objects such as foilage utilizing a rotating mask or filter having transparent portions thereon that correspond to the shape of the diffraction pattern or Fourier transform of the generally linear man-made objects, a source of coherent light and a lens for imaging on the filter the diffraction pattern or Fourier transform of a target containing man-made objects and natural objects; the target being located in the focal plane of the lens.

---

Figure 1:
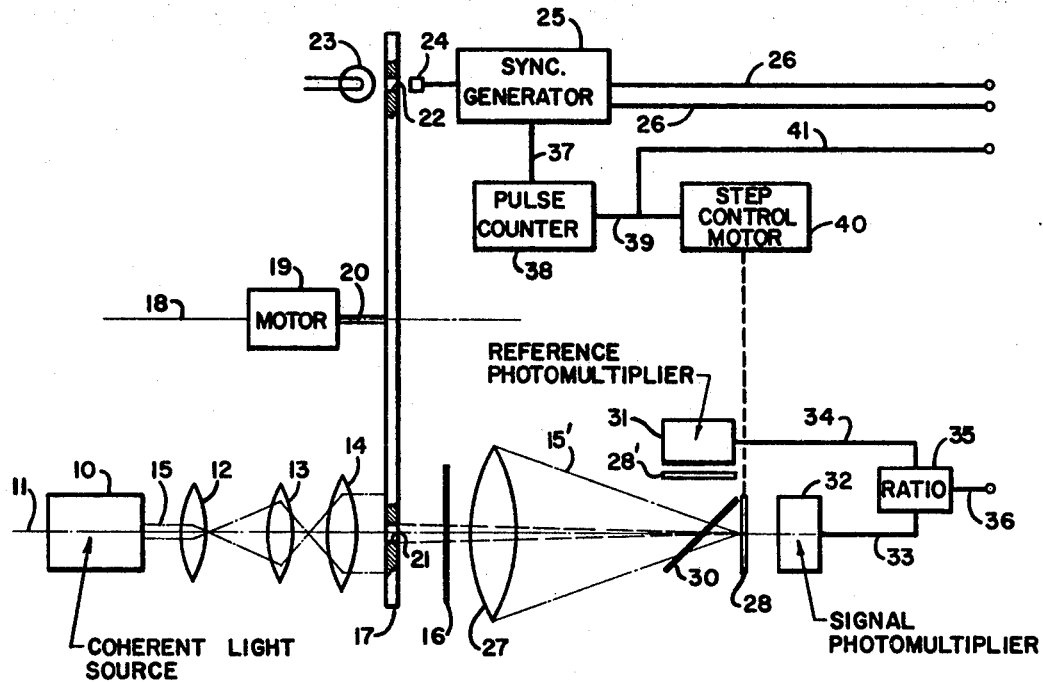

The present invention relates to the field of automatic photographic interpretation.

In analyzing photographic data, such as reconnaissance photographs, it is desirable to distinguish between culture, that is, man-made objects, and objects which occur as a part of nature. As is obvious, the process of manually reviewing photographic materials to determine the presence or absence of such man-made objects can be extremely time consuming. In addition, many objects of interest may be missed by an observer and judgments based thereon are subject to human errors.

It is accordingly, an object of the present invention to provide an automatic means for determining the presence of man-made objects in photographic data.

Another object of the present invention is to provide a means for determining particular types of man-made objects which are present in photographic data.

The objects of the present invention are realized by exploitation of the fact that most man-made objects are represented in photographs by distinct low-curvature line structure whereas, natural objects are not. For example, the boundaries between a road and the adjacent natural objects, as trees or grass, are represented in a photograph by linear segments.

The present invention provides means for representing or recording only the low-curvature line structure of a photograph; which representation or record could be visual or electrical either as an analog or digital quantity. Such records could then be utilized to reconstruct the photograph with the natural objects missing; alternatively, the information may be used as the input to a logical process which might behave like a recognition process.

With the present invention, the ability to distinguish between man-made objects and natural objects in any given type of photograph does not depend on a knowledge of or an estimate of the location of such man-made objects therein. Rather, if the photograph contains man-made objects, the apparatus of the present invention will find them. The man-made objects with their distinct low-curvature line structure can be isolated without prior knowledge of their location because the apparatus of the present invention does not utilize masking or filtering means that operates upon the pictorial representation of the photographic scene. Instead, the present invention utilizes a masking or filtering means that operates upon the two-dimensional diffraction pattern (spatial frequency spectrum) or Fourier transform of the photographic scene. The diffraction pattern or Fourier transform of man-made objects having low-curvature line structure constitutes a relatively high-energy distribution oriented at right angles to the orientation of the pictorial line structure, whereas natural objects do not exhibit such diffraction patterns. The present invention, therefore, develops means for optically separating the diffraction pattern of man-made objects from natural objects.

Figure 4:
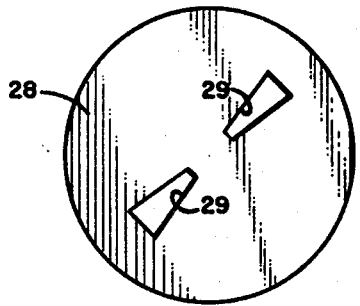
Figure 4A:
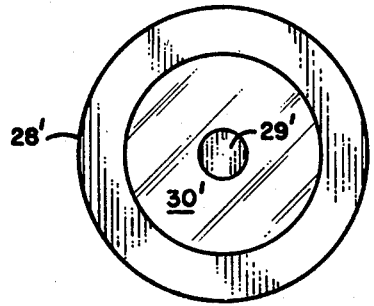
Figure 2:
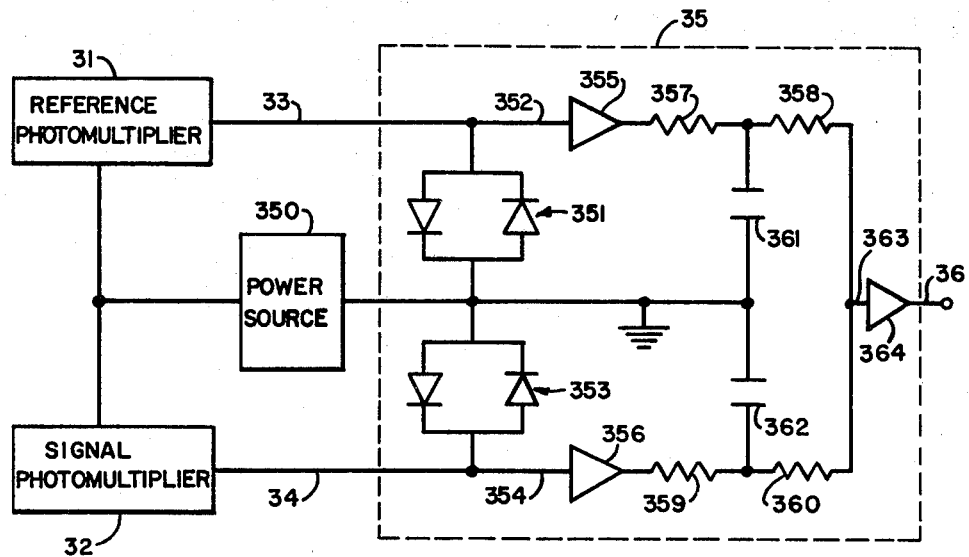
Figure 3:
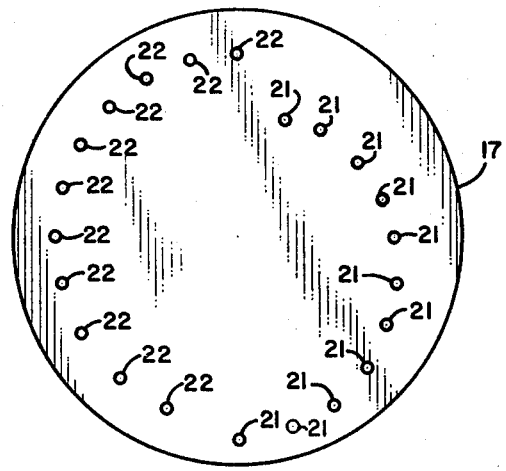
Figure 5:
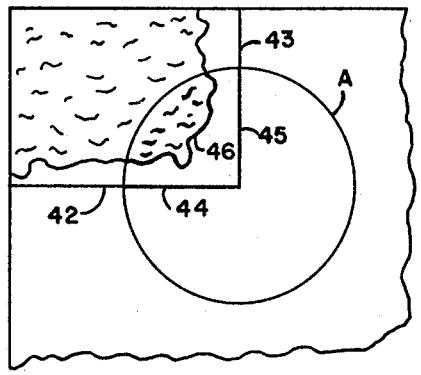
Figure 6:
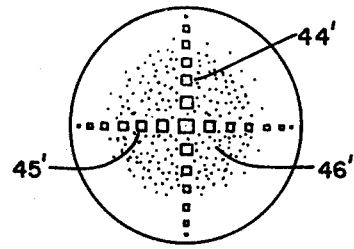
Figure 7:
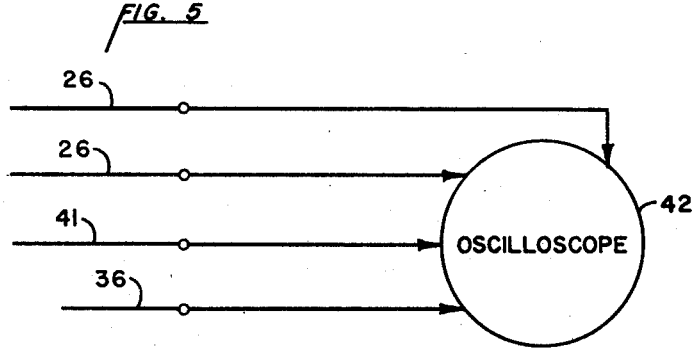
Figure 8:
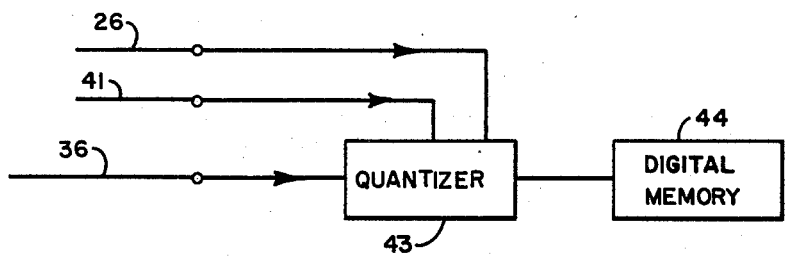

For a fuller understanding of the principles of the present invention, reference may be had to the following detailed description of the same taken in conjunction with the accompanying drawings wherein:

FIGURE 1 is a schematic representation of the apparatus according to the present invention, FIGURE 2 is a circuit diagram of the electronics portion of the apparatus of FIGURE 1, FIGURE 3 is a plane view of a typical scanning disk, and, FIGURE 4 is a plane view of a typical filter or mask, FIGURE 4A is a plane view of the central spot occluder of FIGURE 1, FIGURE 5 illustrates a subarea portion of a photograph greatly enlarged, FIGURE 6 represents the diffraction pattern of the subarea of the photograph of FIGURE 5, FIGURE 7 illustrates an application of the apparatus of FIGURE 1, and, FIGURE 8 illustrates a modified application.

Referring now to the drawings, and more particularly to FIGURE 1, monochromatic coherent light is emitted from light source 10 which may typically be a helium neon laser. Adjacent light source 10 and centered on the axis 11 thereof are a plurality of convex lenses 12, 13, and 14, which lenses function as a telescope to collimate the beam 15 emanating from source 10. A photograph 16 in the form of a transparency is centered on axis 11 and is suitably supported by any convenient means (not shown). Intermediate transparency 16 and lens 14 is a scanning disc 17 having a central axis 18 in spaced relation to the light source central axis 11. A motor 19 is provided to support and rotate disc 17 by means of a shaft 20. As shown in FIGURE 3, the scanning disc 17 may typically be a Nipkow scanning disc having a plurality of scanning apertures 21 spirally arranged about the outer planar face thereof. The apertures 21 may be graded in opacity from the center of each aperture out to the edge thereof. Diametrically opposed to each scanning aperture 21 is a timing or synchronizing aperture 22. The centers of apertures 22 lie in an arc about the center of disc 17. Of course, any other type of suitable scanning means may be utilized.

Referring again to FIGURE 1, a lamp or other light source 23 is located adjacent the path of timing apertures 22. A detector 24 is located adjacent the path of timing apertures 22 and in opposed relation to lamp 23. A synchronizing generator 25 responding to detector 24 is adapted to generate a synchronizing signal via line or lines 26 as is conventional.

In close spaced relation to transparency 16 and centered on axis 11 is provided a lens 27 which can be a Fourier lens as will become apparent hereinbelow. Provided at the focal point of lens 27 is a spatial filter or mask 28. Filter 28 is suitably mounted for rotation about axis 11 and, as shown in FIGURE 4 is of circular shape. The filter is opaque except for two diametrically opposed wedge-shaped transparent portions or slots 29. It is to be understood that the filter and/or the slots could be rectangular. Intermediate lens 27 and filter 28 is a beam splitter 30 that is adapted to transmit a portion of the beam from lens 27 to filter 28 and reflect a portion thereof to a photomultiplier 31, hereinbelow called the reference photomultiplier. Intermediate the reference photomultiplier and beam splitter is a central spot occluder 28'. As shown in FIGURE 4A, occluder 28' has a central opaque circular portion 29', surrounded by a transparent annular portion 30'. A second photomultiplier 32 hereinafter called the signal photomultiplier is provided adjacent filter 28 and is adapted to respond to the energy of the beam 15' passing through filter 28. Output line 32 of the reference photomultiplier 31 transmits a signal which is porportional to the energy in beam 15' passing through occluder 28', which except for the central area is the total energy in the beam, whereas output line 33 of the signal photomultiplier 32 transmits a signal which is proportional to the filter energy from beam 15'. These two signals combine in a unit 35, the details of which are shown in FIGURE 2, that functions to develop an output signal in line 36 that is proportional to the logarithms of the ratios of the input signal in lines 33 and 34. Thus, the signal at 36 is a function of the ratio of the energy in beam 15' passing through filter 28 to the energy passing through occluder 28'. Line 37 provides an electrical communication between the generator 25 and a conventional pulse counter 38, the output, 39, of which is applied to a step control motor 40 and a branch line 41. Motor 40 is adapted to rotate filter 28 a predetermined number of degrees in response to an appropriate control signal from counter 38.

Referring now to FIGURE 2, the photomultipliers 30 and 31 are driven by a high voltage power source 350. A varistor linear-to-log converter 351 is provided to develop a signal in line 352 that is proportional to the log of the signal in line 33. A second varistor 353 is provided to develop a signal in line 354 that is proportional to the log of the signal in line 34. The signals in lines 352 and 354 being suitably amplified by amplifiers 355 and 356, respectively, then pass severally through resistors 357, 358, and 359, 360, and condensers 361 and 362 whereby a signal is developed in line 363 that is proportional to the difference between the signals in lines 354 and 352; this signal being suitably amplified at 364. The signal at 36 is proportional to the differences of the logarithms of the photomultiplier output signals and therefore proportional to the logarithms of the ratios of said signals.

In operation, rotation of disc 17 will permit scannnig aperatures 21 to sequentially allow coherent light from source 10 to scan the total area of transparency 16. At any given arbitrary instant a scanning aperature will permit the light to illuminate a subarea of the transparency, as, for example, subarea A in FIGURE 5 shown greatly enlarged. Subarea A might contain a portion of a pair of intersecting roads 42 and 43, the edges 44 and 45 of which define line segments where the roads meet the natural areas alongside, which could be portions of trees 46 or the like. Since the light that is illuminating subarea A is monochromatic and in phase, the image that is focused by lens 27 onto filter 28 is the Fourier transform or diffraction pattern of the object structure within the subarea; appearing as shown in FIGURE 6. An explanation of this process can be found in any text on physical optics, as for example, "Fundamentals of Physical Optics" by Jenkins and White. As is known, the diffraction pattern of line or edge structure having very high length-to-width ratios comprises a generally linear arrangement at right angles to the orientation of the line or edge structure. Thus, the vertical pattern 44' in FIGURE 6 is the Fourier transform of the edge 44 of subarea A in FIGURE 5 and the horizontal pattern 45' in FIGURE 6 is the transform of the edge 45 of subarea A in FIGURE 5. The pattern of the trees 46 appears as a nonlinear array 46' distributed about the center of the image; these areas are shown as lighter than the linear patterns 44' and 45' since they are of lower energy than the sharp line or edge structure. As a general rule, man-made structure will give linear diffraction patterns whereas that of most natural structure will be more similar to 46' shown in FIGURE 6.

The wedge-shaped slots 29 in filter 28 will permit the linear patterns of man-made objects to be separated from the pattern of natural objects. Moreover, since the filter can be rotated such that the slots therein will have different angular orientations, only the linear structure lying in those angular orientations will be separated. For example, a ssuming that the slots 29 in the filter are oriented vertically, that is at an angle of 90° with the horizontal, then, only the pattern 44' will be permitted to pass through. As pointed out supra, the diffraction pattern of a line is displaced 90° therefrom. Thus, pattern 44' passing through the filter is an indication that the original photo transparency contained a line 90° displaced therefrom, at 180°. This indication would appear as a signal in line 36 of FIGURE 1. The reference photomultiplier 31 and the ratio unit 35 function as a normalizing circuit by dividing the energy passing through the filter 28 by the total energy in the scan area; thereby reducing the output energy appearing in line 36. In this manner, a high-energy pattern that is uniformly arrayed throughout a subarea cannot be erroneously interpreted as a line pattern.

Each time transparency 16 is scanned once, pulse counter 38 actuates motor 40 to rotate filter a given number of degrees, say five. The relative position of the filter appears as a signal in line 41, whereas, the relative position of the scanning apertures appears as a signal in one or more lines 26 as is well known. The presence or absence of a line structure or man-made pattern at that particular angular orientation of filter 28 appears as a signal in line 36 as noted supra. Thus, the signals appearing in lines 26, 41, and 36 contain enough information to reconstruct the man-made structure in the transparency 16. In this manner, the filter is rotated through 360° at discrete increments whereat it tests for the presence of man-made structure contained in the transparency.

As shown in FIGURE 7 the information contained in lines 26, 41 and 36 can be used to actuate a cathode ray display 42 for a visual representation of the information. Thus, lines 26 would provide the horizontal, and vertical sweep synchronization and line 36 would provide the Z axis intensity modulation.

Alternatively, as shown in FIGURE 8 the information contained in lines 26, 41, and 36 could be used as an input for digital storage. Here, the signals from lines 26, 41, and 36 are fed into a quantizer 43, where they are digitalized, and then stored in a digital memory unit 44.

It is also clear that the signals 26, 41, and 36 could be applied directly to an analog storage unit.

While a preferred manner of carrying out the objectives of the present invention has been described, it is apparent that modifications will occur to those skilled in the art. It is therefore intended that the present invention is to be limited only by the scope of the appended claims.

What is claimed is:

1. In an automatic photo culture detector comprising;
   (a) a source of coherent light,
   (b) a photograph,
   (c) means causing a portion of said photograph to be illuminated by said source of light comprising means for scanning said photograph,
   (d) filtering means responsive to light emanating from said photograph for passing therethrough only the energy representing the diffraction pattern of low-curvature line structure appearing in said illuminated portion of said photograph,
   (e) synchronizing means for developing a signal indicative of the relative portions of said photograph being scanned, and
   (f) control means responsive to said synchronizing means for rotating said filtering means a predetermined amount each time the entire area of said photograph is scanned once.

2. The detector of claim 1 further comprising,
(g) detector means responsive to the energy passing through said filter to provide an electrical indication thereof, and,
(h) said detector means including means to normalize the signal passing through said filter means.

3. The detector of claim 2 further comprising;
(i) recording means for combining the signals of said synchronizing control and detector means.

4. In an automatic photo culture detector comprising;
(a) a source of coherent light,
(b) a photograph,
(c) means causing a portion of said photograph to be illuminated by said source of coherent light, and,
(d) filtering means responsive to the light emanating from said photograph for passing therethrough only the energy representing the diffraction pattern of low-curvature line structure appearing in said illuminated portion of said photograph, said filtering means comprising an opaque plate having a pair of diametrically opposed generally linear transparent portions.

5. The detector according to claim 4 wherein said transparent portions comprise wedge-shaped slots.

6. An automatic photo culture detector comprising:
(a) a source of coherent light,
(b) a photograph,
(c) a scanning disc intermediate said light source and said photograph, having a plurality of apertures therethrough,
(d) a filter having a pair of diametrically opposed slots therein,
(e) a lens in close spaced relation to said photograph for focusing the light passing through said photograph in the plane of said filter,
(f) a first photodetector adjacent said filter for developing a signal that is proportional to the energy passing therethrough,
(g) a beam splitter intermediate said filter and lens,
(h) a second photodetector adjacent said beam splitter,
(i) a central spot occluder intermediate said second photodetector and said beam splitter,
(j) a synchronizing generator adjacent some of the apertures in said scanning disc,
(k) a motor for rotating said filter,
(l) a pulse generator responsive to said synchronizing generator for actuating said motor each time said photograph is completely scanned, and,
(m) means responsive to said photodetectors said synchronizing generator and said pulse generator for recording the variable output signals therefrom.

References Cited
UNITED STATES PATENTS

| | | | |
|---|---|---|---|
| 3,409,872 | 11/1968 | Hogg et al. | 350—162 X |
| 3,426,325 | 2/1969 | Partin et al. | 340—146.3 |
| 2,680,200 | 6/1954 | Hercock | 250—217 X |
| 3,174,045 | 3/1965 | Whitney et al. | 250—203 |
| 3,085,469 | 4/1963 | Carlson | 350—162 |

JAMES W. LAWRENCE, Primary Examiner

V. LAFRANCHI, Assistant Examiner

U.S. Cl. X.R.

250—208, 219, 220, 237; 340—146.3; 350—162; 356—71